United States Patent [19]

Cole

[11] Patent Number: 5,109,979
[45] Date of Patent: May 5, 1992

[54] CONTAINERS AND METHODS OF MANUFACTURING THEM

[75] Inventor: Rodney D. Cole, Guildford, United Kingdom

[73] Assignee: Innovation Services Limited, Great Britain

[21] Appl. No.: 657,639

[22] Filed: Feb. 19, 1991

[51] Int. Cl.⁵ .................. B65D 69/00; A45D 40/26; A46B 11/00; B65B 23/00
[52] U.S. Cl. .................. 206/229; 206/209; 206/581; 206/820; 132/320; 401/129; 53/452; 53/472
[58] Field of Search .............. 206/581, 209, 229, 820, 206/823; 132/317, 318, 320; 401/129, 123; 53/452, 473

[56] References Cited

U.S. PATENT DOCUMENTS

| | | |
|---|---|---|
| 2,884,150 | 4/1959 | Weichselbaum et al. ...... 206/820 X |
| 4,512,475 | 4/1985 | Federighi .................. 206/820 X |
| 4,712,936 | 12/1987 | Kessler ..................... 401/129 |
| 4,889,228 | 12/1989 | Gueret ..................... 206/823 X |
| 4,915,234 | 4/1990 | Boeller ..................... 206/229 |
| 4,982,838 | 1/1991 | Fitjer ...................... 206/823 X |

FOREIGN PATENT DOCUMENTS

| | | | |
|---|---|---|---|
| 326529 | 8/1989 | European Pat. Off. ......... 206/820 |
| 2283066 | 3/1976 | France .................... 206/581 |
| 1101918 | 2/1968 | United Kingdom ............ 206/229 |
| 2159699 | 12/1985 | United Kingdom ............ 401/129 |

Primary Examiner—William I. Price
Attorney, Agent, or Firm—Lerner, David, Littenberg, Krumholz & Mentlik

[57] ABSTRACT

A method of manufacturing a moulded container (1) having an applicator handle (6) associated with it comprises moulding as a one piece unit the container (1) an applicator handle (6) and a frangible moulded connection (8) directly between the container (1) and the applicator handle (6).

58 Claims, 2 Drawing Sheets

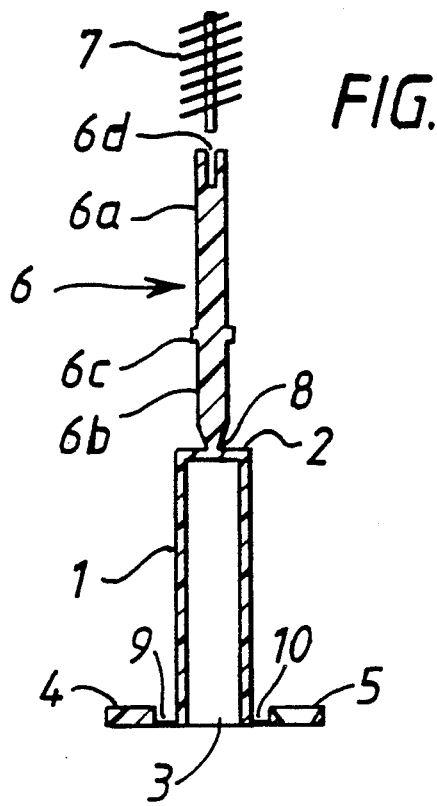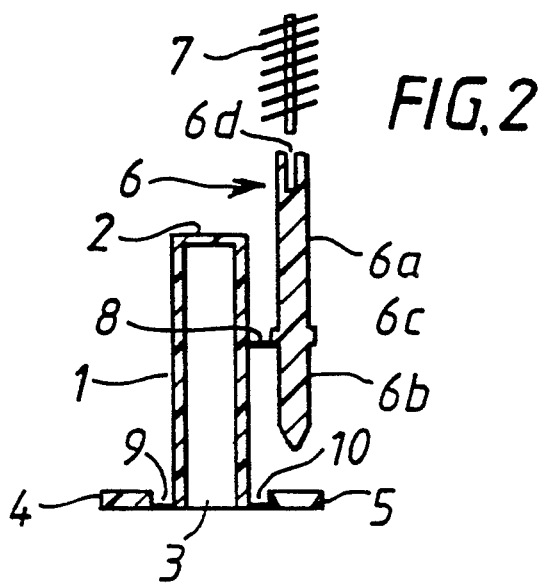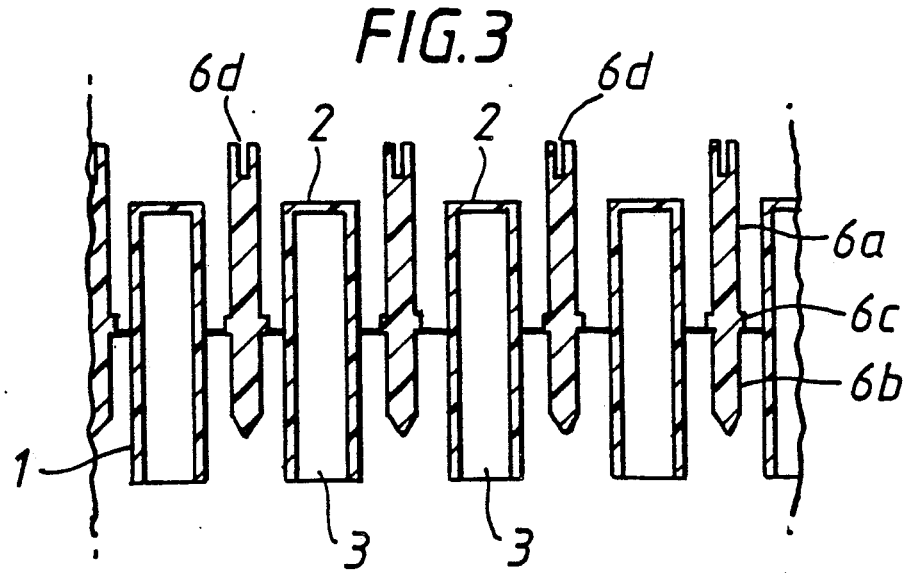

CONTAINERS AND METHODS OF MANUFACTURING THEM

FIELD OF THE INVENTION

The present invention relates to containers and methods of manufacturing them. It is particularly applicable to containers for cosmetic materials, e.g liquid, semi-liquid, paste-like or viscous material such as mascara, eyeliner compositions, etc.

BACKGROUND OF THE INVENTION

It is known to provide certain cosmetics such as nail varnish in small sample, promotional or demonstration units sometimes referred to as trial-use packages. Such units may be sent to potential customers through the post, as sample or promotional material, or may be used by demonstrators in department stores, for example, to demonstrate to potential customers the use of a particular cosmetic material. They may also be sold to the end customer.

In the case of demonstrations, it is important that there should be no unhygienic use of the cosmetic material as a result of a number of different potential customers having the cosmetic demonstrated to them. For example, if it were desired to demonstrate on a potential customer the use of a mascara then it would be important for hygienic reasons to ensure that the same applicator for the mascara was not used on more than one customer or even that different applicators used on different customers did not come into contact with the same mascara. There is legislation in some countries to prevent this.

It is known to mould containers from plastics material. It is also known to mould articles from plastics material in which those articles are formed on the branches of a so-called "tree" in the moulding process. Such articles would then be separated from the branches of the "tree", the latter constituting waste or scrap plastic material.

The present invention is concerned with providing an economical method of manufacturing containers, particularly cosmetic containers, and applicators which will also provide a means for overcoming the hygiene problem outlined above when cosmetics are being demonstrated and will also provide a convenient unit for promotional and/or sampling purposes.

SUMMARY OF THE INVENTION

According to the present invention a method of manufacturing a moulded container having an applicator handle associated with it comprises moulding as a one piece unit the container an applicator handle and a frangible moulded connection directly between the container and the applicator handle.

According to another aspect of the present invention there is provided a container and applicator produced by the above-mentioned method.

BRIEF DESCRIPTION OF THE DRAWINGS

How the invention may be carried out will now be described by way of example only and with reference to the accompanying drawings in which:

FIG. 1 shows, partly in section, a cosmetics container and applicator constructed according to the present invention;

FIG. 2 is a view similar to FIG. 1 but showing a second embodiment of the present invention;

FIG. 3 is a view similar to FIG. 2 but showing a bank of containers and applicators as shown in FIG. 2.

DESCRIPTION OF THE PREFERRED EMBODIMENTS

Figure 4:
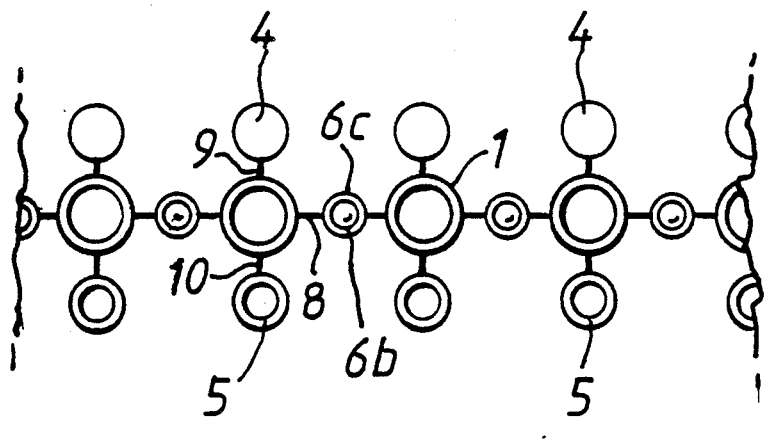
FIG. 4 is plan view of the arrangement of FIG. 3.

A small container 1, for mascara (or other cosmetic material) is moulded from a thermoplastics material. The container 1 is substantially cylindrical in shape and could have any desired cross-section such as circular, square or oval.

In this embodiment the container has a closed end 2 and an open end 3 which is closeable by a cap 4. A wiper device 5 is also provided.

There is an applicator device 6 which consists of a stem 6a and a handle 6b, and in this embodiment, a seal 6c.

The end of the stem 6a is provided with a socket 6d into which a small brush 7 is adapted to be fitted.

The elements 1, 2, 4, 5 and 6 are all moulded in one piece from a thermoplastics material.

The mould is arranged so that the end of the handle portion 6b of the applicator 6 is connected directly to the closed end or base of the container 1 by a frangible connection 8.

The cap 4 is connected to the top end of the container 1 by a frangible connection 9. Similarly, the wiper element 5 is connected to the top end of the container 1 by a frangible connection 10.

The wiper element 5 consists of an annular member which is adapted to be fitted within the container 1. The brush 7 and stem 6a are adapted to pass through the annular wiper unit 5 to be located within the container or to be withdrawn therefrom. The wiper element 5 thus wipes any excess contents from the brush 7 as the applicator is extracted from within the container 1. In this way excess material is removed from the brush 7 prior to the material (e.g mascara) being applied to the users person by means of the applicator 6.

With this arrangement the amount of material needed to mould the various units is reduced compared with an arrangement in which each of the units are moulded on the ends of the branches of a "tree".

As an alternative construction to that shown and described in FIG. 1, the open end 3 of the container 1 could be closed by means of a heat sealable membrane or foil (not shown) or simply crimped together while being heated. The cap 4 and wiper 5 can either be broken away from the top end of the container 1 and then fitted in position in relation to the container or they could be left hinged to the top end of the container so that they can then be folded inwardly into their operative positions.

In this embodiment, the applicator consists of the brush 7 but it could take other forms. Furthermore, the operative part of the applicator (the equivalent of the brush 7) could be formed integrally with the stem 6 and not formed as a separate unit as shown in FIG. 1.

FIG. 2 shows an alternative arrangement to that shown in FIG. 1 in which the applicator 6 lies alongside (instead of end to end) in relation to the container 1 during the moulding process.

In FIG. 2 the same reference numerals have been used to designate the same parts as in FIG. 1.

As a modification of the arrangement shown in FIG. 2, the container 1 could be open at both ends and the wiper element 5 could be moulded integrally with the container. This alternative arrangement is shown in FIG. 5.

Figure 5:
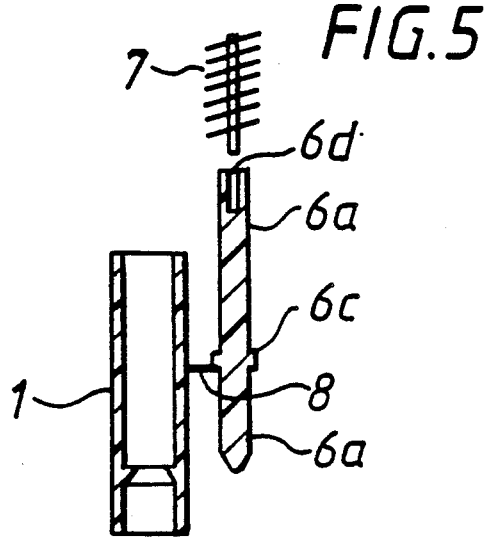
FIG. 5 is a view similar to FIG. 2 of an alternative arrangement.

FIGS. 1, 2 and 5 illustrate a single unit comprising a container, an applicator, and optionally a cap 4 and wiper element 5 to be associated with the container.

The invention could also be used to provide a bank of such units, all of them being moulded integrally with one another in one injection moulding step.

Figure 6:
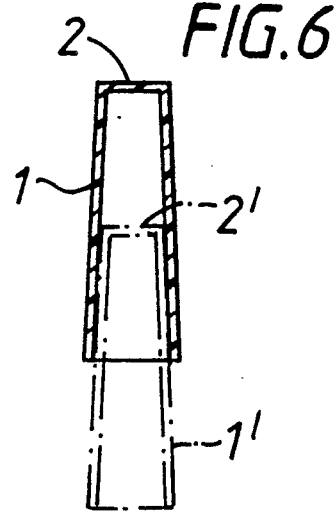
FIG. 6 is a scrap view showing an alternative shape for the containers of the previous figures.

Such an arrangement of a bank of units is shown in FIGS. 3 and 4 where again the same reference numerals have been used to designate parts which are equivalent to those shown in FIGS. 1 and 2. The container 1 may be shaped so that containers of one bank of units can nest in the containers of another bank of units in the manner shown in FIG. 6. This has advantages where the molding of the containers is carried out in one location and the banks of containers are then transported to another location for filling with the cosmetic such as mascara. By making each container of a nesting shape a plurality of banks take up less transportion space.

As indicated earlier, one of the advantages of the method of manufacture of the present invention is that less thermoplastic material is wasted in the moulding process because the relevant units are not moulded on the ends of the branches of "trees" but are moulded in direct connection with one another, such as the applicator 6 being connected directly to the container 1 by the frangible connection 8.

A further advantage of the present invention, and particularly the arrangement shown in FIG. 3 is that it is suited to use in demonstrations of the kind indicated earlier in this specification or to the supply of samples to potential customers.

For example, if a demonstrator in a department store is wishing to demonstrate the use of a particular mascara to a number of potential customers then a bank such as that shown in FIG. 3 could be employed.

With this bank the demonstrator would simply break off one of the units consisting of a container 1 and applicator 6 and then break off the applicator from the container in order to insert the applicator into the mascara contained within the container 1. This would be done either by breaching a seal across the open end 3 of the container or by opening the cap 4 already provided to close the end 3 of the container.

Having applied the mascara to the eye lashes of the first customer the applicator and associated container would then be thrown away.

When the next potential customer arrived for a demonstration the demonstrator would break off the next container/applicator unit from the bank of such units as shown in FIG. 3.

In this way, any risk to hygiene by the use of one unit in connection with more than one customer would be avoided.

The method of the present invention reduces manufacturing costs in a number of ways. Firstly, the arrangement described can be manufactured using only one mould thus reducing the total amount of machinery or equipment required. Furthermore, compared with prior art arrangements, any assembly costs are reduced because, in effect, the end customer carries out the final assembly.

A suitable material for the one-piece moulding is polyamide polypropylene.

Although the present invention has been described with reference to the embodiments shown in the drawings, it is not limited to these detailed arrangements.

For example, the shapes and configurations of the container in relation to the applicator could be different from that illustrated and the details of construction of the container and applicator could also vary. Applicators other than brushes could be employed.

Furthermore, the present invention could be used not only in relation to cosmetics but also in relation to other materials.

I claim:

1. A method of manufacturing a moulded container having an associated applicator handle comprises moulding as a one-piece unit the container, the applicator handle, and a frangible moulded connection directly between the container and the applicator handle.

2. A method as claimed in claim 1 in which the applicator handle and the container are moulded end-to-end.

3. A method as claimed in claim 1 in which the container and applicator handle are moulded side-by-side.

4. A method of manufacturing a moulded container having an associated applicator handle comprises moulding as a one-piece unit, the container, the applicator handle, a frangible moulded connection directly between the container and the applicator handle, a cap adapted to close one end of the container and a frangible moulded connection directly between the cap and the container.

5. A method as claimed in claim 4 in which the applicator handle and the container are moulded end-to-end.

6. A method as claimed in claim 4 in which the container and applicator handle are moulded side-by-side.

7. A method of manufacturing a moulded container having an associated applicator handle comprises moulding as a one-piece unit the container, the applicator handle, a frangible moulded connection directly between the container and the applicator handle, a wiper element adapted to be inserted into the container and a frangible moulded connection directly between the wiper element and the container.

8. A method as claimed in claim 7 in which the applicator handle and the container are moulded end-to-end.

9. A method as claimed in claim 7 in which the container and applicator handle are moulded side-by-side.

10. A method of manufacturing a moulded container of substantially tubular shape open at both ends having an associated applicator handle comprises moulding as a one-piece unit, the container, the applicator handle, a first frangible moulded connection directly between the container and the applicator handle, a wiper unit and a second frangible moulded connection directly between the wiper unit and the container.

11. A method as claimed in claim 10 in which the applicator handle and the container are moulded end-to-end.

12. A method as claimed in claim 10 in which the container and applicator handle are moulded side-by-side.

13. A method of manufacturing a moulded container having an associated applicator handle comprising moulding as a one-piece unit, a substantially tubular tapered container, the applicator handle and a frangible moulded connection directly between the container and the applicator handle so that the applicator handle is moulded at the side of the container.

14. A method as claimed in claim 13 including the step of also moulding integrally with the interior of the container a wiper element.

15. A method as claimed in claim 1 in which the stem of a brush is moulded integrally with the applicator handle, the operative part of the brush being adapted to be connected to the stem after the unit has been moulded.

16. A method as claimed in claim 4 in which the stem of a brush is moulded integrally with the applicator handle, the operative part of the brush being adapted to be connected to the stem after the unit has been moulded.

17. A method as claimed in claim 7 in which the stem of a brush is moulded integrally with the applicator handle, the operative part of the brush being adapted to be connected to the stem after the unit has been moulded.

18. A method as claimed in claim 10 in which the stem of a brush is moulded integrally with the applicator handle, the operative part of the brush being adapted to be connected to the stem after the unit has been moulded.

19. A method as claimed in claim 13 in which the stem of a brush is moulded integrally with the applicator handle, the operative part of the brush being adapted to be connected to the stem after the unit has been moulded.

20. A method as claimed in claim 1 comprising moulding as one-piece a plurality of units each comprising the one-piece unit of claim 1.

21. A method as claimed in claim 4 comprising moulding as one-piece a plurality of units each comprising the one-piece unit of claim 4.

22. A method as claimed in claim 7 comprising moulding as one-piece a plurality of units each comprising the one-piece unit of claim 7.

23. A method as claimed in claim 10 comprising moulding as one-piece a plurality of units each comprising the one-piece unit of claim 10.

24. A method as claimed in claim 13 comprising moulding as one-piece a plurality of units each comprising the one-piece unit of claim 13.

25. A method as claimed in claim 1 comprising the additional steps of filling the container with cosmetic material and sealing the container closed.

26. A method as claimed in claim 4 comprising the additional steps of filling the container with cosmetic material and sealing the container closed by means of the cap.

27. A method as claimed in claim 7 comprising the additional steps of filling the container with cosmetic material and sealing the container closed.

28. A method as claimed in claim 10 comprising the additional steps of filling the container with cosmetic material and sealing the container closed.

29. A method as claimed in claim 13 comprising the additional steps of filling the container with cosmetic material and sealing the container closed.

30. A one-piece moulding comprising a container, an applicator handle, and a frangible connection directly between the container and the applicator handle.

31. A moulding as claimed in claim 30 in which the applicator handle and the container are moulded end-to-end.

32. A moulding as claimed in claim 30 in which the container and applicator handle are moulded side-by-side.

33. A one-piece moulding comprising a container, an applicator handle, a frangible moulded connection directly between the container and the applicator handle, a cap adapted to close one end of the container and a frangible moulded connection directly between the cap and the container.

34. A moulding as claimed in claim 33 in which the applicator handle and the container are moulded end-to-end.

35. A moulding as claimed in claim 33 in which the container and applicator handle are moulded side-by-side.

36. A one-piece moulding comprising a container, an applicator handle, a frangible connection directly between the container and the applicator handle, a wiper element adapted to be inserted into the container and a frangible connection directly between the wiper element and the container.

37. A moulding as claimed in claim 36 in which the applicator handle and the container are moulded end-to-end.

38. A moulding as claimed in claim 36 in which the container and applicator handle are moulded side-by-side.

39. A one-piece moulding comprising a container, an applicator handle, a first frangible connection directly between the container and the applicator handle, a wiper unit and a second frangible connection directly between the wiper unit and the container.

40. A one-piece moulding as claimed in claim 39 in which the applicator handle and the container are moulded end-to-end.

41. A one-piece moulding as claimed in claim 39 in which the container and applicator handle are moulded side-by-side.

42. A one-piece moulding comprising a substantially tubular tapered container, an applicator handle and a frangible connection directly between the container and the applicator handle so that the applicator handle is moulded at the side of the container.

43. A moulding as claimed in claim 42 including a wiper element moulded integrally with the interior of the container.

44. A moulding as claimed in claim 30 in which the stem of a brush is moulded integrally with the applicator handle, the stem being adapted to have an operative part of the brush being connected to the stem after the unit has been moulded.

45. A moulding as claimed in claim 33 in which the stem of a brush is moulded integrally with the applicator handle, the stem being adapted to have an operative part of the brush connected to the stem after the unit has been moulded.

46. A moulding as claimed in claim 36 in which the stem of a brush is moulded integrally with the applicator handle, the stem being adapted to have an operative part of the brush connected to the stem after the unit has been moulded.

47. A moulding as claimed in claim 39 in which the stem of a brush is moulded integrally with the applicator handle, the stem being adapted to have an operative part of the brush connected to the stem after the unit has been moulded.

48. A moulding as claimed in claim 42 in which the stem of a brush is moulded integrally with the applicator handle, the stem being adapted to have an operative part of the brush connected to the stem after the unit has been moulded.

49. A one-piece moulding comprising a plurality of units each comprising the one-piece unit of claim 30.

50. A one-piece moulding comprising a plurality of units each comprising the one-piece unit of claim 33.

51. A one-piece moulding comprising a plurality of units each comprising the one-piece unit of claim 36.

52. A one-piece moulding comprising a plurality of units each comprising the one-piece unit of claim 39.

53. A one-piece moulding comprising a plurality of units each comprising the one-piece unit of claim 42.

54. A moulding as claimed in claim 30, cosmetic material in the container and sealing means sealing the container closed.

55. A moulding as claimed in claim 33, cosmetic material in the container and the cap sealing the container.

56. A moulding as claimed in claim 36, cosmetic material in the container, and sealing means sealing the container closed.

57. A moulding as claimed in claim 39, cosmetic material in the container and sealing means sealing the container closed.

58. A moulding as claimed in claim 42, cosmetic material in the container and sealing means sealing the container closed.

* * * * *